(12) United States Patent
Swope et al.

(10) Patent No.: US 12,160,559 B2
(45) Date of Patent: Dec. 3, 2024

(54) CALIBRATION SYSTEM AND METHOD FOR DATA CAPTURE SYSTEM

(71) Applicant: ZEBRA TECHNOLOGIES CORPORATION, Lincolnshire, IL (US)

(72) Inventors: Charles Burton Swope, Coral Springs, FL (US); Stanko Jelavic, Davie, FL (US); Miguel X. Gines, Deerfield, FL (US); Chinmay Nanda, Central Islip, NY (US); Matthew B. Hayes, Wheaton, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 194 days.

(21) Appl. No.: 17/925,161

(22) PCT Filed: May 15, 2020

(86) PCT No.: PCT/US2020/033241
§ 371 (c)(1),
(2) Date: Nov. 14, 2022

(87) PCT Pub. No.: WO2021/230884
PCT Pub. Date: Nov. 18, 2021

(65) Prior Publication Data
US 2023/0188702 A1    Jun. 15, 2023

(51) Int. Cl.
*H04N 17/00*   (2006.01)
*G06T 7/80*    (2017.01)
*H04N 23/20*   (2023.01)

(52) U.S. Cl.
CPC .............. *H04N 17/002* (2013.01); *G06T 7/80* (2017.01); *H04N 23/20* (2023.01);
(Continued)

(58) Field of Classification Search
CPC ........ H04N 17/002; H04N 23/20; G06T 7/80; G06T 2207/10016; G06T 2207/10048;
(Continued)

(56) References Cited

U.S. PATENT DOCUMENTS

2003/0063292 A1*  4/2003  Mostafavi ............ A61N 5/1048
                                                        356/614
2008/0039716 A1   2/2008  Tuma
(Continued)

OTHER PUBLICATIONS

Calibration Management Systems, 2015, Elsevier Inc, Industrial Process Automation Systems, Chapter 17, pp. 507-522 (Year: 2015).*
(Continued)

*Primary Examiner* — Marnie A Matt

(57) ABSTRACT

A calibration system includes: a reference device including an array of markers at predetermined positions; a camera; and a computing device configured to: store reference data defining the predetermined positions of the markers in a capture volume frame of reference; obtain a calibration image of the reference device captured by the camera; detect image positions of the markers in the calibration image, the image positions defined according to camera frame of reference; based on the image positions of the markers and the reference data, generate calibration data mapping coordinates in the camera frame of reference to coordinates in the capture volume frame of reference.

20 Claims, 9 Drawing Sheets

(52) U.S. Cl.
CPC ............... *G06T 2207/10016* (2013.01); *G06T 2207/10048* (2013.01); *G06T 2207/20212* (2013.01); *G06T 2207/30204* (2013.01); *G06T 2207/30244* (2013.01)

(58) Field of Classification Search
CPC . G06T 2207/20212; G06T 2207/30204; G06T 2207/30244; G06T 2207/10028
USPC .......................................................... 348/164
See application file for complete search history.

(56) References Cited

U.S. PATENT DOCUMENTS

| | | |
|---|---|---|
| 2008/0292131 A1 | 11/2008 | Takemoto et al. |
| 2009/0113986 A1 | 5/2009 | Goldbach |
| 2014/0118339 A1 | 5/2014 | Davies et al. |
| 2017/0287166 A1 | 10/2017 | Claveau et al. |
| 2018/0364371 A1* | 12/2018 | Hossbach ............... G01T 1/208 |
| 2022/0180559 A1* | 6/2022 | Visan ........................ G06T 7/74 |
| 2022/0335649 A1* | 10/2022 | Nayak ....................... G06T 7/74 |

OTHER PUBLICATIONS

Miller et al. "Improved machine tool linear axis calibration through continuous motion data capture." In: Precision Engineering/ Sep. 2, 2016 (Sep. 2, 2016) Retrieved on Jul. 31, 2020 (Jul. 31, 2020) from <https://reader.elsevier.com/reader/sd/pii/S0141635916301830?token=F9B8FA8768C4C7ECF63A6166436F0FFDD3092B27D0185BED7F323FD85BED7F323FD85E37FF7A31C930D877F39A7D74EA4D2667A0F71C> entire document.

International Search Report and Written Opinion for International Application No. PCT/US2020/033241 mailed on Aug. 14, 2020.

* cited by examiner

CALIBRATION SYSTEM AND METHOD FOR DATA CAPTURE SYSTEM

BACKGROUND

Imaging-based dimensioning systems may be employed to detect objects such as packages and determine the dimensions of such objects. Such dimensioning systems may also detect and dimension moving objects, such as packages being transported, e.g. via forklift. Systems enabled to dimension moving objects may employ motion tracking subsystems to track the position of the forklift or other vehicle transporting the object to be dimensioned. Calibration such motion tracking subsystems, however, can be time-consuming and computationally demanding.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
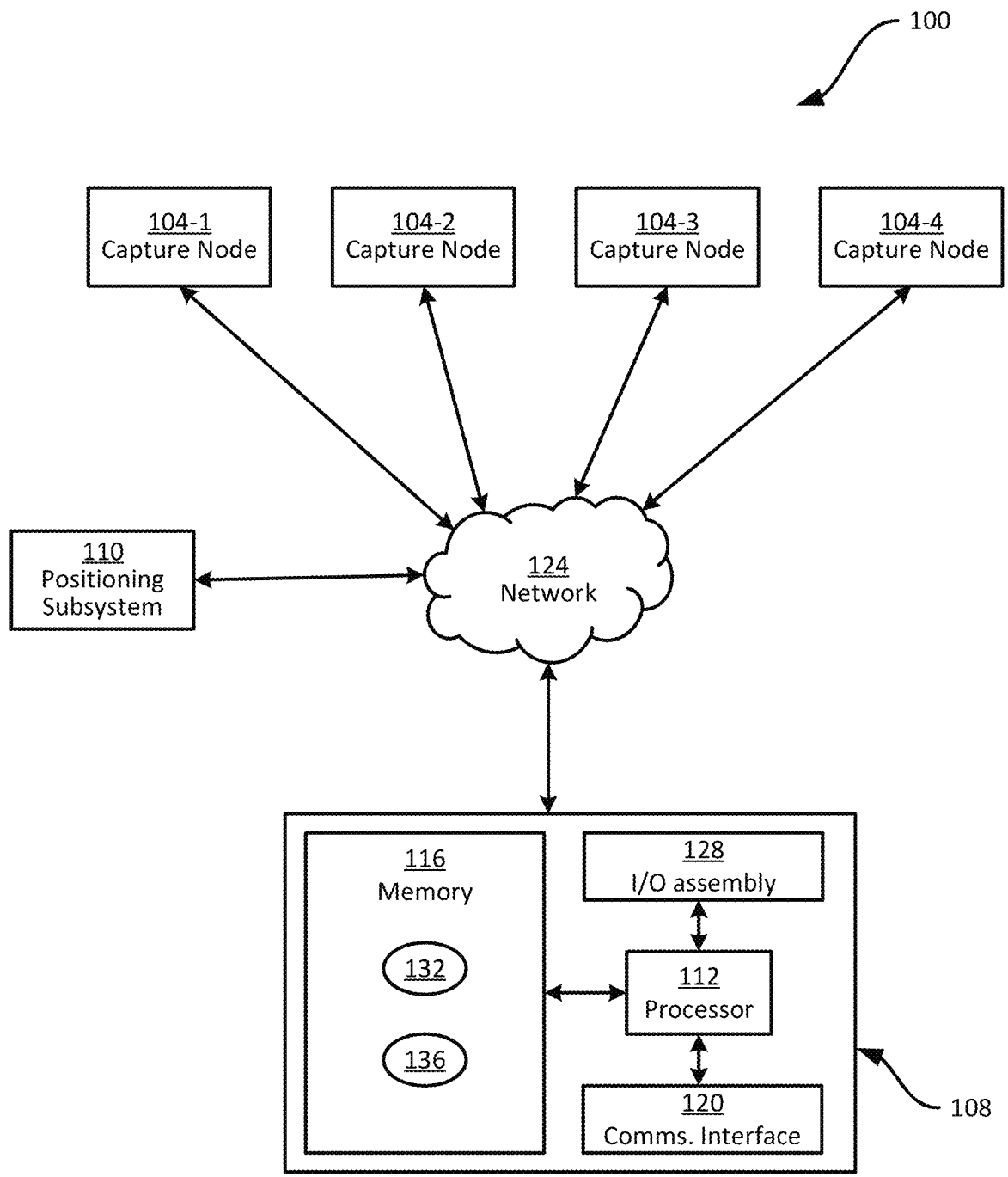
FIG. 1 is a block diagram of an example data capture system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a calibration system, comprising: a reference device including an array of markers at predetermined positions; a camera; and a computing device configured to: store reference data defining the predetermined positions of the markers in a capture volume frame of reference; obtain a calibration image of the reference device captured by the camera; detect image positions of the markers in the calibration image, the image positions defined according to camera frame of reference; and based on the image positions of the markers and the reference data, generate calibration data mapping coordinates in the camera frame of reference to coordinates in the capture volume frame of reference.

Additional examples disclosed herein are directed to a calibration method, comprising: storing, at a computing device, reference data defining predetermined positions in a capture volume frame of reference of a plurality of markers disposed on a reference device; obtaining a calibration image of the reference device captured by a camera connected to the computing device; detecting image positions of the markers in the calibration image, the image positions defined according to camera frame of reference; and based on the image positions of the markers and the reference data, generating calibration data mapping coordinates in the camera frame of reference to coordinates in the capture volume frame of reference.

Further examples disclosed herein are directed to a non-transitory computer readable medium storing computer-readable instructions executable by a computing device to: store reference data defining predetermined positions in a capture volume frame of reference of a plurality of markers disposed on a reference device; obtain a calibration image of the reference device captured by a camera connected to the computing device; detect image positions of the markers in the calibration image, the image positions defined according to camera frame of reference; and based on the image positions of the markers and the reference data, generate calibration data mapping coordinates in the camera frame of reference to coordinates in the capture volume frame of reference.

FIG. 1 depicts a data capture system 100 for object dimensioning. The data capture system 100 is configured to capture image data depicting an object within a capture volume. The image data (e.g. a set of two-dimensional images captured substantially simultaneously) can be processed to generate a point cloud representing the object to be dimensioned. Dimensions for the object can then be determined based on the point cloud.

In particular, the system 100 includes a plurality of capture nodes 104. In the illustrated example, four capture nodes 104-1, 104-2, 104-3 and 104-4 are shown. In other examples, a greater or smaller number of capture nodes 104 can be provided. Each capture node 104 includes a set of cameras controllable to capture respective images of the above-mentioned capture volume. More specifically, the cameras of each capture node 104 capture images of a given region of the capture volume. Together, the regions of coverage of the capture nodes 104 encompass substantially the entire capture volume. From the images captured by the cameras of a given node 104, a computing device associated with that node 104 generates a point cloud (e.g. via the execution of a photogrammetry application or other suitable point cloud generation mechanism).

In the illustrated example, therefore, the capture nodes 104 produce four point clouds, each depicting a respective region of the capture volume containing the object. The regions, and therefore the point clouds generated at the capture nodes 104, generally overlap at the boundaries thereof.

The system 100 also includes a data capture server 108, also referred to simply as the server 108. The server 108 is connected to the computing devices of each of the capture nodes 104, and receives the above-mentioned point clouds from the capture nodes 104. The server 108 is configured to combine the point clouds from the capture nodes 104 to produce a single point cloud depicting at least a portion of the capture volume. The server 108 is further configured, as will be described in greater detail below, to select a portion of the combined point cloud that contains the object and excludes other structures, such as a forklift or other transporter carrying the object. Once the portion of the point cloud representing the object has been selected, the server 108 can then determine dimensions for the object.

The above-mentioned object and the forklift or other transporter carrying the object may be stationary when the images used to generate point clouds are captured by the nodes 104. The object and the transporter may also be in motion, however. To enable dimensioning of the object when the object is in motion, the system 100 also includes a positioning subsystem 110. The positioning subsystem 110, in cooperation with the server 108 or another computing device, enables a position of the transporter and the object to be tracked through the capture volume, e.g. by capturing images and detecting fiducial markers mounted on the transporter in those images. The tracked position of the transporter can be then be employed to detect and remove the transporter from the point cloud before detecting and dimensioning the object.

To accurately track the position of the transporter, the positioning subsystem 110 is calibrated prior to operation of the system 100. In general, the calibration process defines a mapping between data captured by the positioning subsystem (e.g. two-dimensional images, as will be discussed below in greater detail) and three-dimensional coordinates corresponding to the capture volume.

To enable calibration of the positioning subsystem 110, a calibration reference device is provided for use with the system 100. The reference device, as well as its use to generate calibration data for the positioning subsystem 110, will be described herein in greater detail. As will be apparent in the discussion below, the positioning subsystem 110 itself, as well as the calibration device and procedure, may be deployed with other types of dimensioning systems beyond the example provided above based on a set of image capture nodes.

FIG. 1 also illustrates certain internal components of the server 108. The server 108 includes a central processing unit (CPU), also referred to as a processor 112, interconnected with a non-transitory computer readable storage medium, such as a memory 116. The memory 116 includes any suitable combination of volatile memory (e.g. Random Access Memory (RAM)) and non-volatile memory (e.g. read only memory (ROM), Electrically Erasable Programmable Read Only Memory (EEPROM), flash) memory. The processor 112 and the memory 116 each comprise one or more integrated circuits (ICs).

The server 108 also includes a communications interface 120, enabling the server 108 to exchange data with other computing devices, for example via a network 124. The communications interface 120 therefore includes any suitable hardware (e.g. transmitters, receivers, network interface controllers and the like) allowing the server 108 to communicate over the network 124.

The server 108 can also 124 further includes an input/output assembly 128, which can include a suitable combination of input devices (e.g. a keyboard, a mouse, a microphone, or the like) and output devices (e.g. a display, a speaker or the like). The components of the server 108 are interconnected by communication buses (not shown), and powered by a battery or other power source, over the above-mentioned communication buses or by distinct power buses (not shown).

The memory 116 of the server 108 stores a plurality of applications, each including a plurality of computer readable instructions executable by the processor 112. The execution of the above-mentioned instructions by the processor 112 causes the server 108 to implement certain functionality, as discussed herein. The applications are therefore said to be configured to perform that functionality in the discussion below. In the present example, the memory 116 of the server 108 stores a calibration application 132, and a dimensioning application 136 (also referred to herein simply as the applications 132 and 136, respectively).

The server 108 is configured, via execution of the application 132 by the processor 112, to control the positioning subsystem 110 in conjunction with deployment of the above-mentioned calibration reference device, to capture images of the reference device and determine the above-mentioned mapping between image coordinates used by the positioning subsystem 110 and the actual space defining the capture volume.

Execution of the application 136, meanwhile, configures the server 108 to implement various functions to dimension objects within the capture volume. For example, the server 108 can detect a position of the transporter as the transporter and object travel through the capture volume based on the above-mentioned calibration data and on data captured by the positioning subsystem 110. The server can further generate a combined point cloud from data received from the capture nodes 104, and dimension the object using combined point cloud and the tracked position of the transporter.

The applications 132 and 136 can, in other examples, be implemented as a single application, or as more than two applications. In other examples, the processor 112, as configured by the execution of the applications 132 and 136, is implemented as one or more specifically-configured hardware elements, such as field-programmable gate arrays (FPGAs) and/or application-specific integrated circuits (ASICs). In further examples, the functionality implemented by the server 108 via the execution of an application, such as the application 136, can be implemented by a separate computing device, such as a dimensioning server accessible via the network 124, rather than by the server 108.

Figure 2:
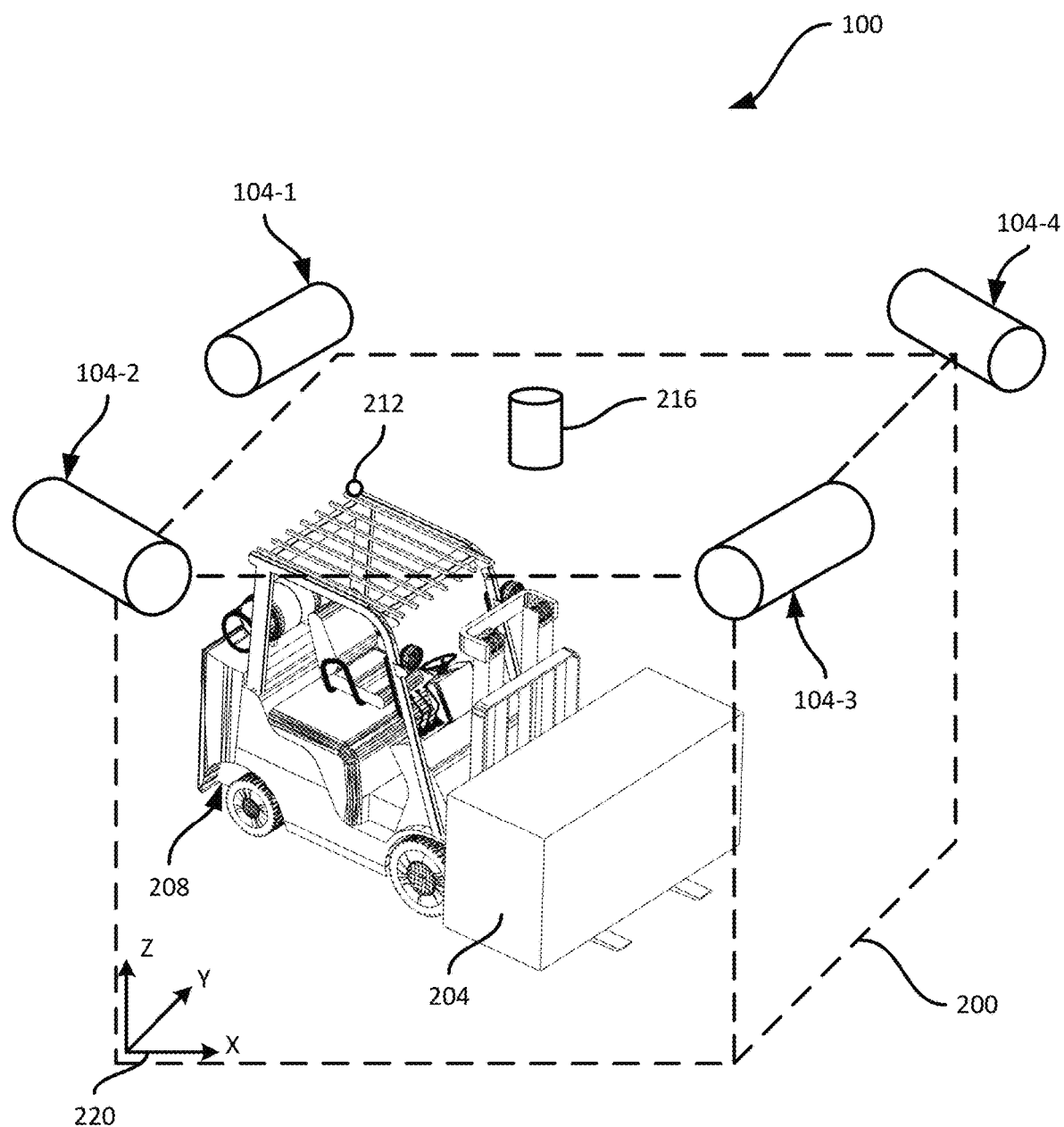
FIG. 2 is a diagram illustrating an example implementation of the data capture system of FIG. 1.

Turning to FIG. 2, certain components of the system 100 are shown in an example deployment. The example deployment shown in FIG. 2 includes the four capture nodes 104 mentioned above, e.g. with the cameras and projector of each node 104 contained within a substantially cylindrical housing. A wide variety of other structural arrangements may also be employed for each node 104. The nodes 104 are supported by a truss system, a central support structure, e.g. suspended from a ceiling, or the like. The nodes 104 are supported such that the cameras each point towards at least a portion of a capture volume 200 through which an object 204 is transported, e.g. by a forklift 208.

The forklift can include a plurality of fiducial markers thereon, an example marker 212 of which is illustrated in FIG. 2. The marker 212 can include any suitable reflective marker, such as an infrared-reflective marker. More generally, the type of the marker 212 is selected based on the nature of the positioning subsystem 110.

The positioning subsystem 110 includes a camera 216, such as an infrared camera, positioned over the capture volume 200. The camera 216 is positioned such that a field of view (FOV) of the camera 216 encompasses substantially all of the capture volume 200. The positioning subsystem 110 may also include other components, such as at least one projector (e.g. an infrared projector, when the camera 216 is an infrared camera) configured to illuminate the capture volume 200 during both calibration procedures and data capture for dimensioning purposes. In some examples, the projector can be configured to illuminate an area greater than the capture volume 200, at least during calibration.

The point clouds generated by the nodes 104 may be generated according to a common frame of reference 220 that corresponds to the capture volume 200. Positions of the forklift 208 are therefore also determined according to the frame of reference 220. As will be apparent, however, images captured by the camera 216 define an array of pixels according to a frame of reference specific to the camera 216 itself (e.g. a two-dimensional coordinate system corresponding to the image sensor of the camera 216). To determine the location of a point of interest in an image from the camera 216 in the frame of reference 220, the above-mentioned calibration data is employed to transform image coordinates specific to the camera 216 into coordinates expressed in the frame of reference 220.

Prior to use of the system 100 for dimensioning the object 204, a calibration reference device is placed within the capture volume 200 and at least one image of the reference device is captured by the camera 216. The image(s) captured by the camera 216 is then processed by the server 108 to generate the calibration data. In some examples, the reference device may extend beyond the boundaries of the capture volume, and the image captured by the camera 216 may also depict an area larger than the floor of the capture volume 200.

Figure 3A:
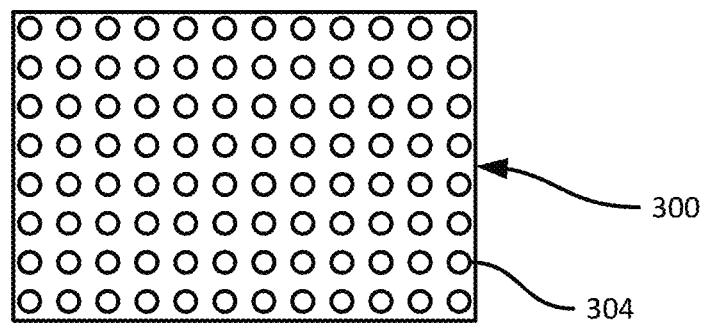
FIG. 3A is an overhead view of a calibration reference device for use in the system of FIG. 1.
Figure 3B:
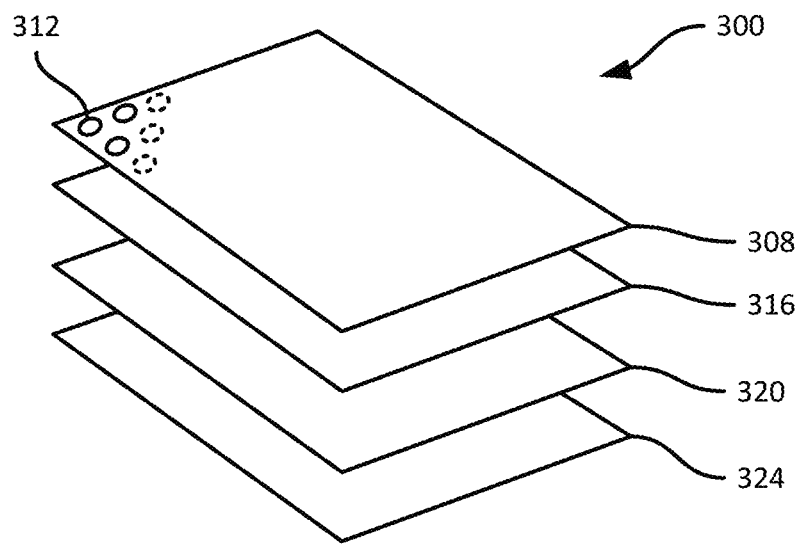
FIG. 3B is an isometric exploded view of the reference device of FIG. 3A.
Figure 3C:
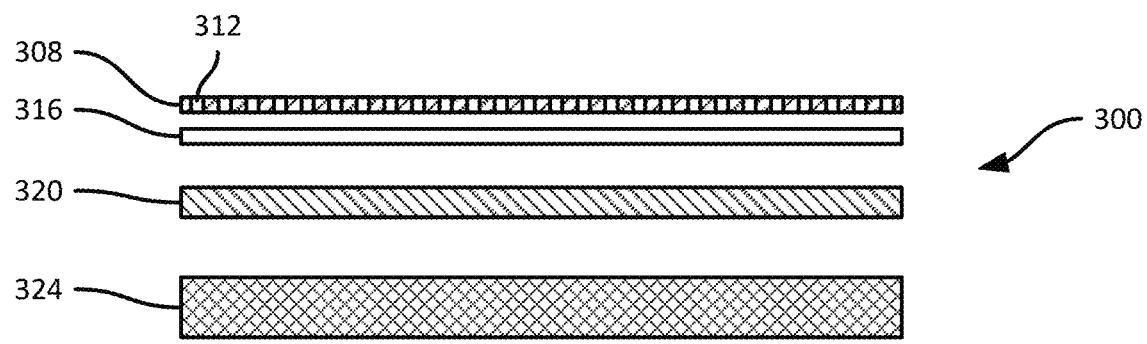
FIG. 3C is a side view of the exploded reference device of FIG. 3B.

Turning to FIGS. 3A, 3B and 3C, the reference device will be discussed in greater detail. FIG. 3A illustrates a top view of a reference device 300. The reference device 300 includes a plurality of reflective markers 304, such as circular IR-reflective markers. The markers 304 are disposed on the reference device 300 at predetermined positions. For example, a reference device can include markers 304 each having a width of one half inch, spaced apart from adjacent markers 304 by one inch. A wide variety of other marker arrangements can be employed. In general, the dimensions and spacing of the markers 304 are selected to accommodate the greatest number of markers 304 on the reference device 300 (providing the greatest resolution for calibration) that can be accurately distinguished from one another within images captured by the camera 216.

FIGS. 3B and 3C illustrate an example structure for the reference device 300. The reference device 300 is a generally planar device that, as will be described in greater detail below, is placed on or near a floor within the capture volume 200 for capture by the camera 216.

In particular, the reference device can include an upper layer 308 having a plurality of holes therein, dimensioned and arranged according to the desired size and spacing of the markers 304. For example, the upper layer 308 may be peg board cover paper. A reflective layer 316 (e.g. reflective paper, reflective tape, foil or the like) is affixed to the underside of the upper layer 308, such that the reflective material is visible from above the device 300 through the holes 312. In some examples, rather than a single piece of reflective material as shown in FIGS. 3B and 3C, smaller pieces of reflective material may be placed under subsets of the holes 312 (including individual holes 312).

The device 300 further includes a support member 320 such as a flexible mat onto which the upper layer 308 and the reflective layer 316 are affixed, and a base member 324 such as plywood, metal or the like to provide rigidity to the device 300 when assembled. In other examples, the support member 320 may be omitted, and the upper layer 308 and reflective layer 316 may be affixed directly to the base member 324.

Figure 4:
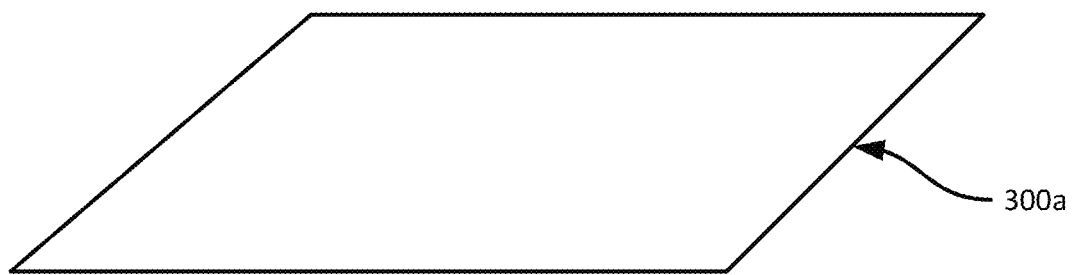
FIG. 4 is a diagram illustrating two example implementations of the reference device of FIGS. 3A-3C.
Figure 4:
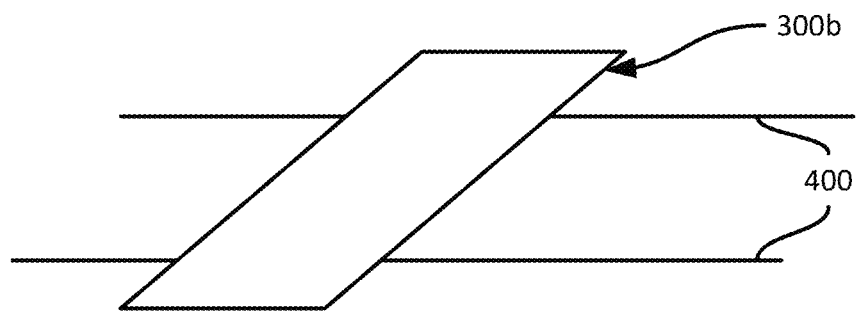

Turning to FIG. 4, various configurations of the reference device 300 are contemplated. For example, a first configuration 300a has dimensions that substantially match those of the floor in the capture volume 200. A second configuration 300b, however, has a similar width as the configuration 300a but a reduced length. That is, the reference device 300b traverses the entirety of the capture volume 200 floor in one direction, but only a portion of the capture volume 200 in a second direction. As will be seen below, the reference device 300b is imaged multiple times to generate calibration data, at different positions within the capture volume 200. The calibration apparatus may also include at least one rail 400 placed on or integrated into the floor in the capture volume 200, and along which the reference device 300b may be moved between the different positions mentioned above.

Figure 5:
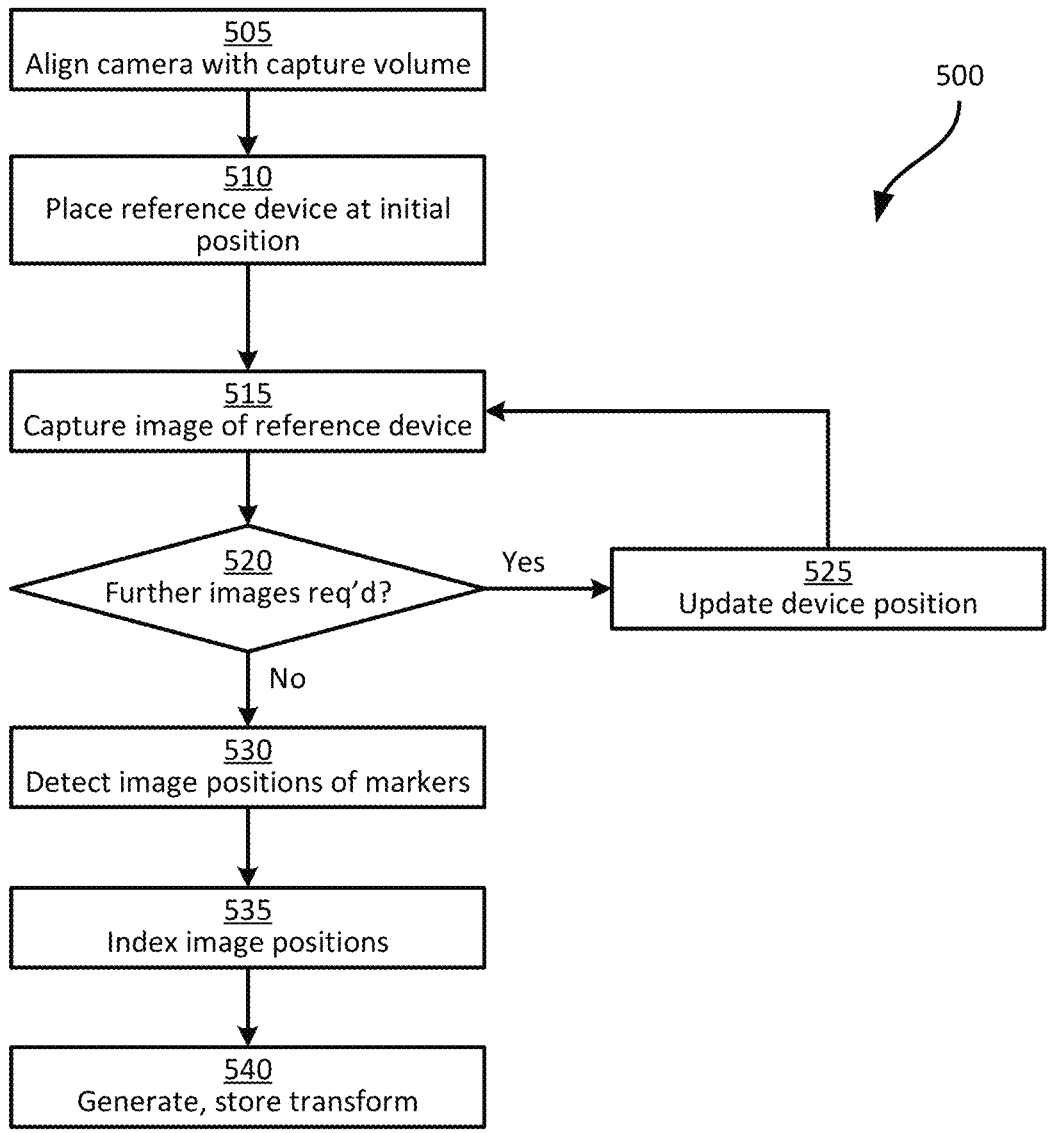
FIG. 5 is a flowchart of a calibration method.

Turning to FIG. 5, a method 500 of calibrating the positioning subsystem 110 is illustrated. Performance of the method 500 will be discussed in conjunction with its performance in the system 100 using the reference device 300.

At block 505, the camera 216 is aligned with the capture volume. In particular, the camera 216 is positioned such that an optical axis of the camera is perpendicular to the floor in the capture volume, and such that the image coordinates of the camera are parallel to the floor plane of the frame of reference 220 (that is, to the X and Y axes shown in FIG. 2). Various mechanisms may be employed to align the camera 216 at block 505. For example, markers similar to the markers 304 may be placed at various points on the floor within the capture volume, and the camera 216 can be controlled from the server 108 to capture and display a video feed while the position of the camera 216 is adjusted. Positional adjustment may be accomplished via a servo or other mechanism coupled to the camera 216.

In an example alignment procedure, a position at which the optical axis of the camera 216 intersects the floor of the capture volume 200 is determined, e.g. via a plumb bob suspended from the camera 216. A reflective marker may be placed at that location, and two additional markers may be placed at equal distances on either side of the central marker. The camera 216 may then be tilted until the pixel distances between the central marker and each of the side markers are equal, indicating that the optical axis of the camera 216 is perpendicular to the floor of the capture volume.

The camera 216 may then be rotated until the side markers mentioned above are aligned with one dimension of the image coordinates (e.g. until the two side markers appear on a single horizontal line in images captured by the camera 216).

At block 510, the reference device 300 is placed at an initial position within the capture volume 200. When the reference device 300a is employed, the initial position is the only position at which the reference device 300a is placed throughout the performance of the method 500. The reference device 300a is centered within the capture volume 200 on the floor, and occupies substantially the entire floor of the capture volume 200 (and therefore the entire field of view of the camera 216).

Figure 6:
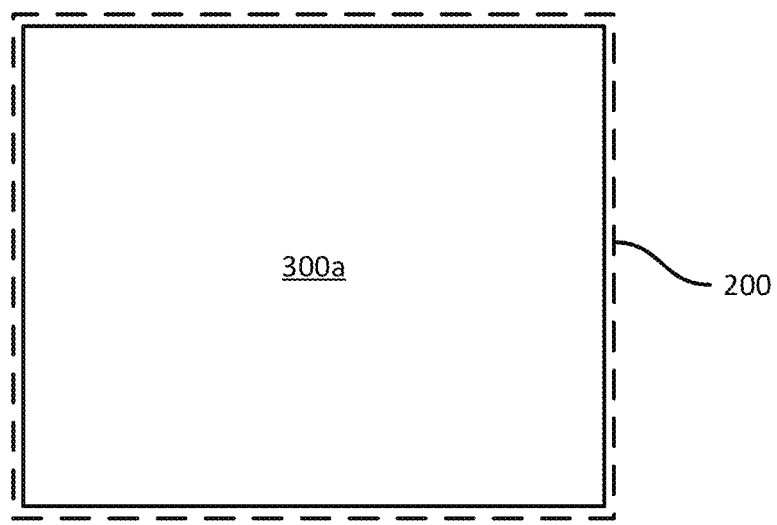
FIG. 6 is a diagram illustrating example performances of block 510 of the method of FIG. 5.
Figure 6:
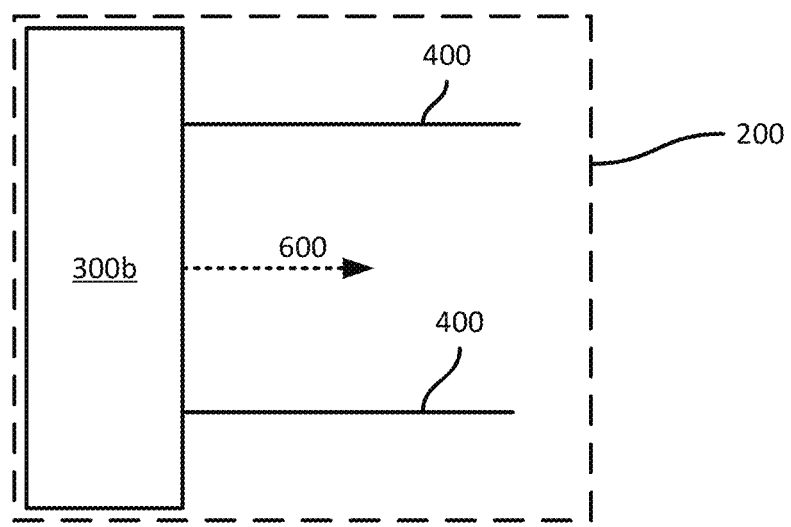

When the reference device 300b is employed, the initial position is, for example, at one side of the capture volume 200. Referring briefly to FIG. 6, the reference devices 300a and 300b are shown relative to the floor of the capture volume 200 in the initial position from block 510. As seen in FIG. 6, the reference device 300a occupies substantially the entire floor area of the capture volume 200, while the reference device 300b is placed along the left side of the capture volume 200. The reference device 300b will subsequently be shifted in the direction 600 along the rails 400.

Figure 7:
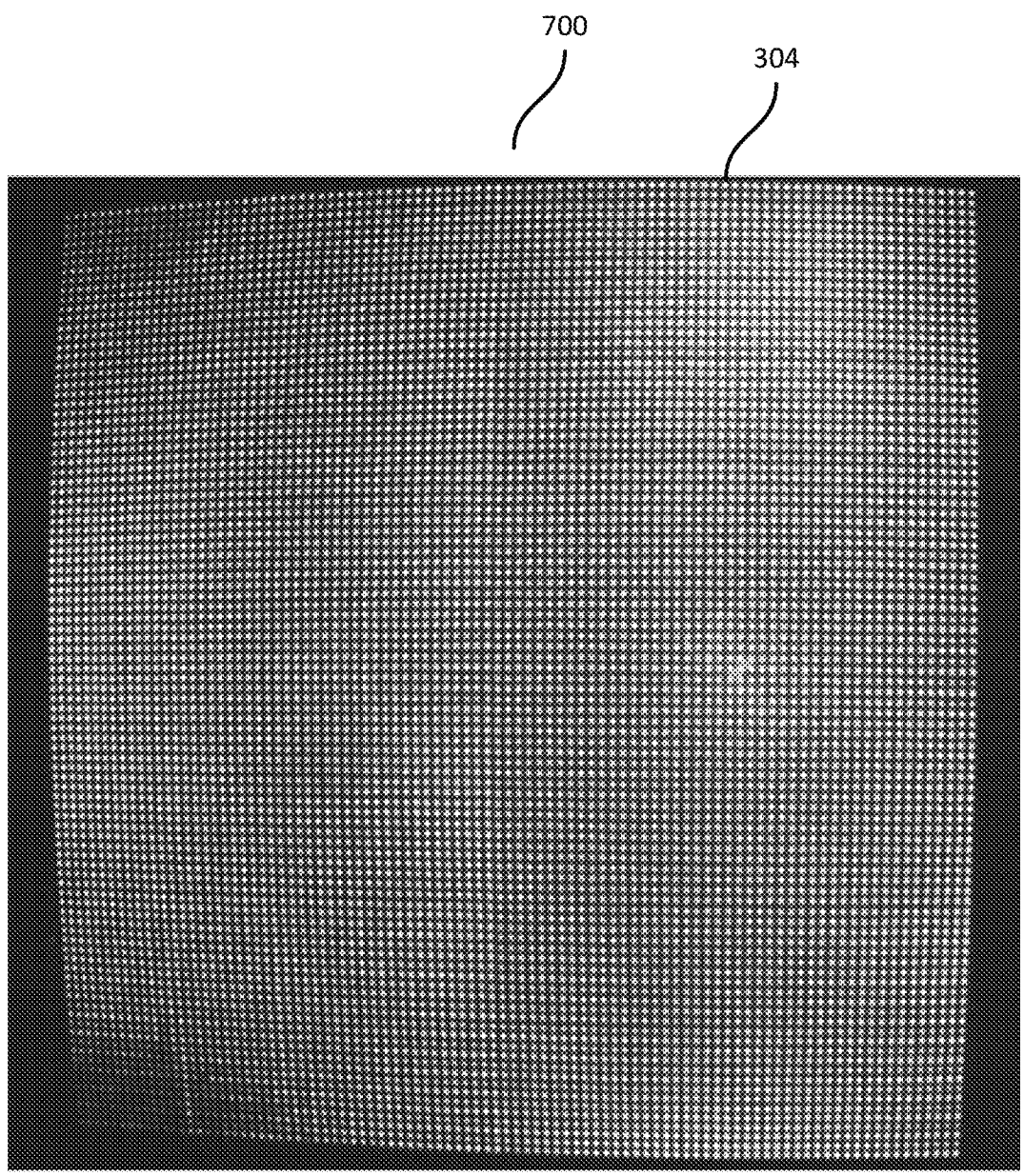
FIG. 7 is an example calibration image captured at block 515 of the method of FIG. 5.

Returning to FIG. 5, at block 515 the server 108 controls the camera 216 to capture an image of the reference device 300 as positioned at block 510. When the positioning subsystem 110 includes projectors, the projectors are also activated at block 515. FIG. 7 illustrates an example image 700 in which the markers 304 are visible as light-colored regions on a dark background.

At block 520, a determination is made whether additional images are required to generate calibration data. The determination at block 520 is negative when the reference device 300a is used, because the reference device 300a occupies the entire capture volume 200 floor. When the reference device 300b is used, however (or any other reference device that does not span the entire floor of the capture volume 200), the determination at block 520 is affirmative.

Figure 8:
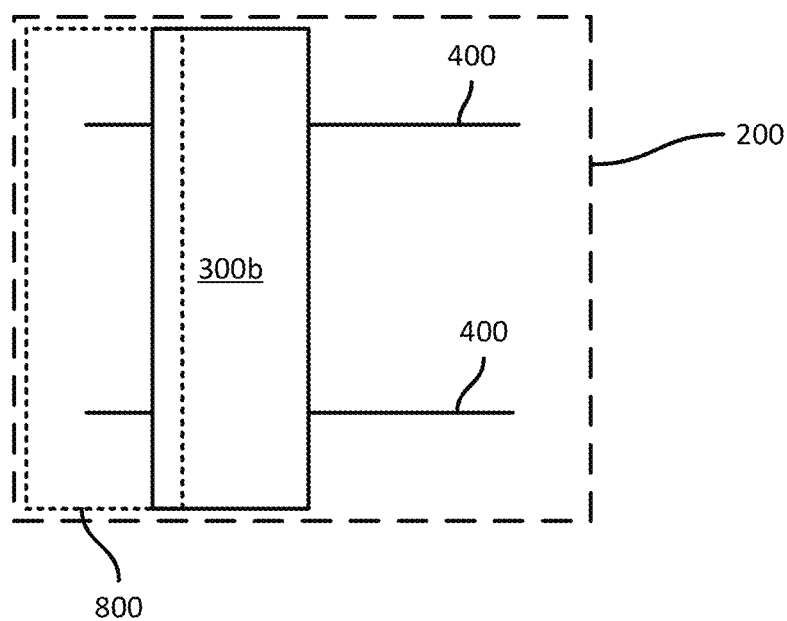
FIG. 8 is a diagram illustrating an example performance of block 525 of the method of FIG. 5.

Following an affirmative determination at block 520, performance of the method 500 proceeds to block 525. At block 525, the position of the reference device 300b is updated. In particular, the reference device 300b is repositioned along the rails 400 to overlay a further portion of the floor of the capture volume 200. Turning to FIG. 8, an updated overhead view of the capture volume 200 is shown, in which the reference device 300b has been shifted along the rails 400 from an initial position 800 (shown in FIG. 6) to a second position. As seen in FIG. 8, the adjusted position overlaps with the initial position 800. In other examples, however, the adjusted and updated positions need not overlap.

When the repositioning of the apparatus 103 is complete, the server 108 controls the camera 216 to capture another image at block 515. When multiple instances of block 515 are performed, the images captured thereby are combined to form a composite calibration image according to any suitable image registration technique. Following the repeated performance of block 515, blocks 520 and 525 are repeated until the composite image formed by sequential performances of block 515 encompasses the entire floor of the capture volume 200. That is, the determination at block 520 is affirmative when the reference device 300b has been shifted to the opposite side of the capture volume 200 through repeated performances of block 525.

Following an affirmative determination at block 520, performance of the method 500 proceeds to block 530. At block 530, the server 108 is configured to determine the image positions of the markers 304 from the calibration image. That is, the server 108 is configured to detect each marker 304 and determine a set of image coordinates (e.g. X and Y coordinates in the frame of reference of the camera 216) for each marker 304.

Detection of the markers 304 can be performed by, for example, detecting bright spots in the calibration image and locating the centroid of each bright spot. Centroid detection may enable the server 108 to determine the image positions of the markers 304 with sub-pixel accuracy. At block 535, the server 108 is then configured to index the image positions of the markers 304 determined at block 530. Indexing the image positions of the markers 304 includes assigning each image position to a position in a two-dimensional array corresponding to the predetermined positions of the markers 304 on the reference device 300.

Figure 9:
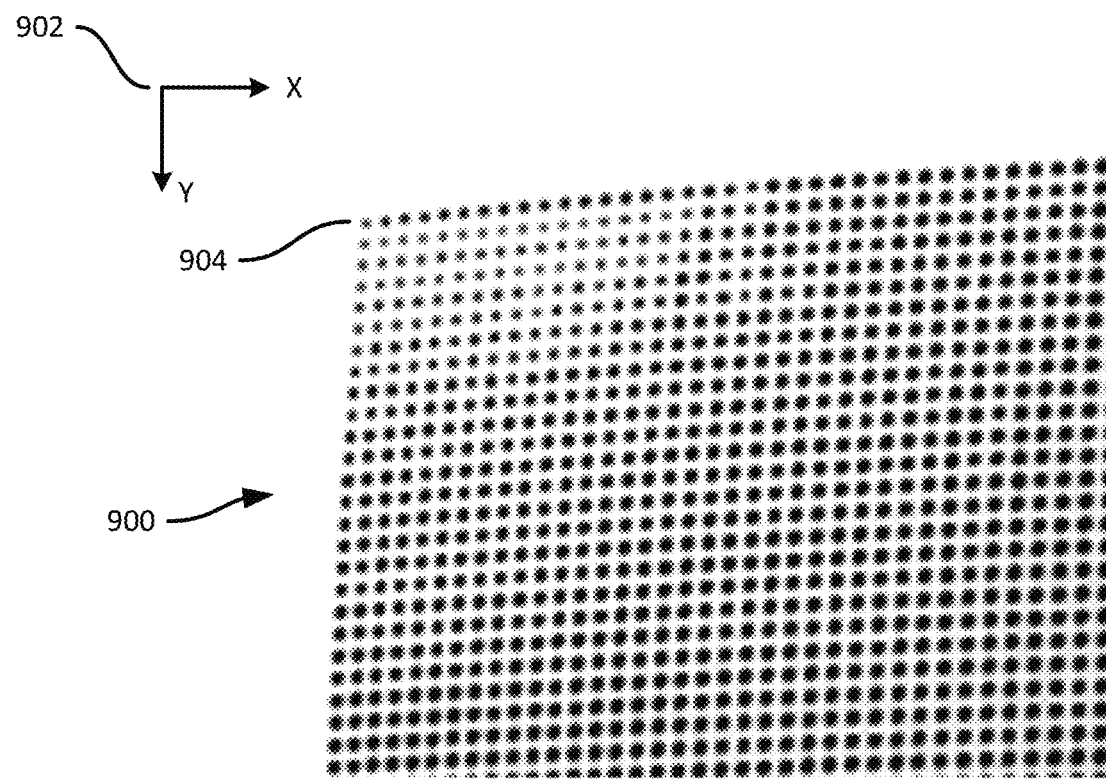
FIG. 9 is a portion of the image of FIG. 7, illustrating a performance of block 535 of the method of FIG. 5.

Turning to FIG. 9, a portion 900 of the image 700 is shown (with colors inverted for clearer illustration). Each marker 304 as depicted in the image 700 (and more specifically, the portion 900) has image coordinates in a camera frame of reference 902. For example, a top left marker position 904 is indicated in FIG. 9. The top left marker position 904 corresponds to the top-left marker 304, e.g. as shown in FIG. 3A. However, the X coordinate of the position 904 is not the furthest to the left, and the Y coordinate of the position 904 is also not the furthest toward the top of the image 700.

To correctly assign each marker 304 as represented in the image 700 to the corresponding predetermined position defined by the reference device 300, the server 108 is configured to sort the marker positions in each of the two dimensions of the frame of reference 902. That is, the server 108 generates two sorted lists of marker positions, including one list with the marker positions ordered from smallest X coordinate to largest, and another list with the marker positions ordered from smallest Y coordinate to largest. Although the marker position 904 will not appear at the top of either list, the combined ranking of the marker position 904 may be employed to determine that the marker position 904 corresponds to a top-left marker 304 of the reference device 300.

The above-mentioned combined ranking of each marker position, according to the dimensions of the camera frame of reference 902, may therefore be employed to assign each marker position to a corresponding one of the actual markers 304 of the reference device 300. As will now be apparent, the predefined size and spacing of the markers 304 gives the markers 304 positions in the frame of reference 220. The positions of the markers 304 in the frame of reference 220 when the reference device 300 is deployed may be stored in the memory 316 as reference data prior to the performance of the method 500. Therefore, the indexing of marker positions from the calibration image generates a mapping of image positions to physical positions within the capture volume 200.

Returning to FIG. 5, at block 540 the server 108 is configured to generate and store calibration data defining a general transform between the camera frame of reference 902 and the capture volume frame of reference 220. In particular, the indexing at block 535 assigns specific image positions to specific positions in the frame of reference 220, but does not assign every pixel in the frame of reference 902 to a corresponding position in the frame of reference 220.

At block 540, the server 108 can therefore interpolate, based on the indexing of block 535, positions in the frame of reference 220 for each pixel in the camera frame of reference 902. The calibration data generated at block 540 can therefore include an array having the same size as the frame of reference 902 (e.g. the resolution of the camera 216), with each element of the array containing a pair of coordinates in the frame of reference 220 (e.g. an X coordinate and a Y coordinate).

In some examples, the size of the calibration data may be reduced by generating, at the server 108, a compressed representation of the above mapping. For example, the server 108 can be configured to generate a spine (e.g. a set of polynomial equations) for each row and/or column of pixels in the frame of reference 902 that maps each pixel in the row and/or column to a corresponding position in the frame of reference 220.

The calibration data generated at block 540 is stored in the memory 116 for use during the execution of the dimensioning application 136. In other examples, the calibration data may be transmitted to another computing device, e.g. when the calibration processing of the method 500 is performed by a different computing device than the dimensioning functionality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A calibration system, comprising:
   a reference device including an array of markers at predetermined positions;
   a camera; and
   a computing device configured to:
   store reference data defining the predetermined positions of the markers in a capture volume frame of reference;
   obtain a calibration image of the reference device captured by the camera;
   detect image positions of the markers in the calibration image, the image positions defined according to camera frame of reference; and
   based on the image positions of the markers and the reference data, generate calibration data mapping coordinates in the camera frame of reference to coordinates in the capture volume frame of reference.

2. The calibration system of claim 1, further comprising:
   a projector;
   wherein the computing device is configured to activate the projector simultaneously with activation of the camera to capture the calibration image.

3. The calibration system of claim 2, wherein the camera is an infrared camera, and wherein the projector is an infrared projector.

4. The calibration system of claim 1, wherein the reference device includes:
   an upper layer having a plurality of holes therein at the predetermined positions; and
   reflective material beneath the upper layer at the predetermined positions.

5. The calibration system of claim 4, wherein the reference device further includes a base member supporting the upper layer and the reflective material.

6. The calibration system of claim 1, wherein the computing device is configured, in order to obtain the calibration image, to:
   obtain a sequence of images with the reference device in a corresponding sequence of positions within the capture volume; and
   generate the calibration image as a composite of the sequence of images.

7. The calibration system of claim 1, wherein the computing device is configured, in order to generate the calibration data, to:
   index the image positions of the markers according to each of a first and second dimension of the camera frame of reference; and
   based on the indexing, assign each image position to one of the predetermined positions.

8. A calibration method, comprising:
   storing, at a computing device, reference data defining predetermined positions in a capture volume frame of reference of a plurality of markers disposed on a reference device;
   obtaining a calibration image of the reference device captured by a camera connected to the computing device;
   detecting image positions of the markers in the calibration image, the image positions defined according to camera frame of reference; and
   based on the image positions of the markers and the reference data, generating calibration data mapping coordinates in the camera frame of reference to coordinates in the capture volume frame of reference.

9. The calibration method of claim 8, further comprising:
   activating a projector simultaneously with activation of the camera to capture the calibration image.

10. The calibration method of claim 9, wherein the camera is an infrared camera, and wherein the projector is an infrared projector.

11. The calibration method of claim 8, wherein the reference device includes:
   an upper layer having a plurality of holes therein at the predetermined positions; and
   reflective material beneath the upper layer at the predetermined positions.

12. The calibration method of claim 11, wherein the reference device further includes a base member supporting the upper layer and the reflective material.

13. The calibration method of claim 8, wherein obtaining the calibration image comprises:
   obtaining a sequence of images with the reference device in a corresponding sequence of positions within the capture volume; and
   generating the calibration image as a composite of the sequence of images.

14. The calibration method of claim 8, wherein generating the calibration data comprises:
   indexing the image positions of the markers according to each of a first and second dimension of the camera frame of reference; and
   based on the indexing, assigning each image position to one of the predetermined positions.

15. A non-transitory computer readable medium storing computer-readable instructions executable by a computing device to:
   store reference data defining predetermined positions in a capture volume frame of reference of a plurality of markers disposed on a reference device;
   obtain a calibration image of the reference device captured by a camera connected to the computing device;
   detect image positions of the markers in the calibration image, the image positions defined according to camera frame of reference; and
   based on the image positions of the markers and the reference data, generate calibration data mapping coordinates in the camera frame of reference to coordinates in the capture volume frame of reference.

16. The non-transitory computer readable medium of claim 15, wherein the instructions are further executable to:
   activate a projector simultaneously with activation of the camera to capture the calibration image.

17. The non-transitory computer readable medium of claim 16, wherein the camera is an infrared camera, and wherein the projector is an infrared projector.

18. The non-transitory computer readable medium of claim 15, wherein the reference device includes:
   an upper layer having a plurality of holes therein at the predetermined positions; and
   reflective material beneath the upper layer at the predetermined positions.

19. The non-transitory computer readable medium of claim 15, wherein the instructions are further executable to obtain the calibration image by:
   obtaining a sequence of images with the reference device in a corresponding sequence of positions within the capture volume; and
   generating the calibration image as a composite of the sequence of images.

20. The non-transitory computer readable medium of claim 15, wherein the instructions are further executable to generate the calibration data by:
   indexing the image positions of the markers according to each of a first and second dimension of the camera frame of reference; and
   based on the indexing, assigning each image position to one of the predetermined positions.

* * * * *